US012621692B2

(12) United States Patent
Khafizov et al.

(10) Patent No.: US 12,621,692 B2
(45) Date of Patent: May 5, 2026

(54) TRACKING USER EQUIPMENT DYNAMICS IN WIRELESS NETWORKS

(71) Applicant: VERIZON PATENT AND LICENSING INC., Basking Ridge, NJ (US)

(72) Inventors: Farid Khafizov, Plano, TX (US); Muhammad Ibraheem, Cypress, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 488 days.

(21) Appl. No.: 18/192,852

(22) Filed: Mar. 30, 2023

(65) Prior Publication Data

US 2024/0334216 A1     Oct. 3, 2024

(51) Int. Cl.
| | |
|---|---|
| *H04W 8/22* | (2009.01) |
| *H04L 43/0811* | (2022.01) |
| *H04W 24/08* | (2009.01) |
| *H04W 64/00* | (2009.01) |

(52) U.S. Cl.
CPC ......... *H04W 24/08* (2013.01); *H04L 43/0811* (2013.01); *H04W 8/22* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 2010/0210255 A1* | 8/2010 | Amirijoo | .......... H04W 74/0833 |
| | | | 455/419 |
| 2010/0216453 A1* | 8/2010 | Kallin | ................... H04W 48/20 |
| | | | 455/434 |
| 2020/0015314 A1* | 1/2020 | Dao | ....................... H04L 67/142 |

* cited by examiner

*Primary Examiner* — Idowu O Osifade

(57) ABSTRACT

In some aspects, the techniques described herein relate to a method including: identifying a first base station (BS) that is out of service at a first time; identifying a first set of user equipment (UE) connected to the first BS in a pre-outage time window occurring before the first time; identifying a second set of UEs, the second set of UEs including UEs connected to other BSs in a wireless network; computing a set of seen UEs based on the second set of UEs and the first set of UEs; computing a set of unseen UEs based on the set of seen UEs and the first set of UEs; predicting a set of UEs that have left a service region that includes the first BS and the other BSs; computing a set of UEs without service based on the first set of UEs, the set of seen UEs, and the set of UEs that have left the service region; and generating a visualization of the set of UEs without service.

20 Claims, 6 Drawing Sheets

500

TRACKING USER EQUIPMENT DYNAMICS IN WIRELESS NETWORKS

BACKGROUND INFORMATION

In wireless networks, computing devices communicate with base station (BS) devices. For example, in a cellular network, user equipment (UE) can communicate with a plurality of geographically distributed base stations. In such networks, the computing devices may be mobile and may thus communicate with multiple BSs over a given time window. As such, the distribution of computing devices can be highly dynamic and current approaches to monitoring this distribution generally fail to reliably identify the distribution.

DETAILED DESCRIPTION

Figure 1:
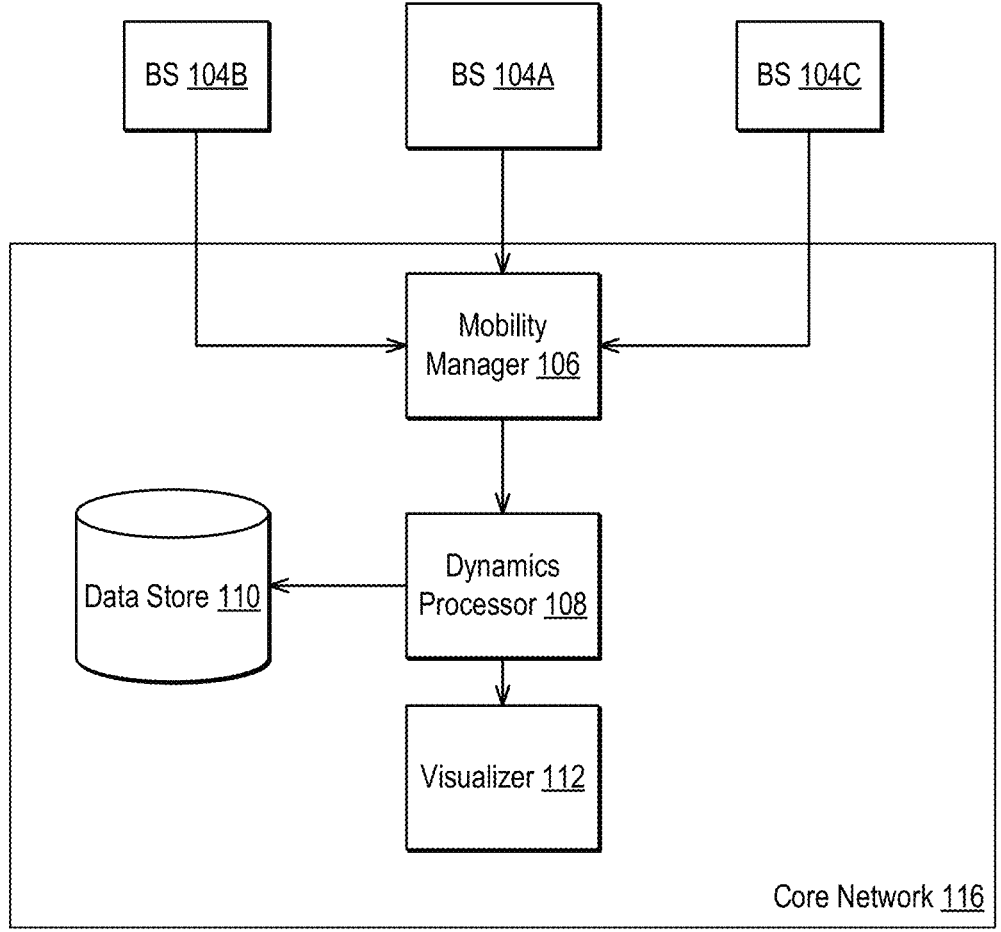
FIG. 1 is a block diagram illustrating a system for tracking UE dynamics.

The example embodiments solve technical problems in wireless networks by accurately reflecting the dynamic distribution of UEs in a wireless network. Current techniques for analyzing UEs in a wireless network generally includes statistical analyses of historical activity. For example, if a given UE has attached to a given BS consistently over a historical time horizon (e.g., the last three weeks), it can be predicted that for the current time horizon (e.g., the next week), the same UE will be attached to the given BS. If this prediction fails, current approaches will generally then manually search a wireless network to identify where a given UE is located.

The example embodiments can generate a data structure representing the distribution of UEs which can then be used to optimize the wireless network. In some implementations, this data structure can represent how many UEs are distributed across the wireless network and how they are distributed. Further, in some implementations, the data structure can represent the presence or absence of UEs for each BS of the wireless network. The wireless network can use this data structure to improve the allocation of resources (both physical and virtual) and thus improve the overall functioning of the wireless network and its underlying computing devices.

The disclosed embodiments describe methods as well as devices, systems, and computer-readable media for perform such methods. In some implementations, the method can include identifying a first base station (BS) that is out of service at a first time and then identifying a first set of user equipment (UE) connected to the first BS in a pre-outage time window that occurs before the first time. Next, the method can include identifying a second set of UEs that includes UEs connected to other BSs in a wireless network.

Based on the second set of UEs and the first set of UEs the method then computes a set of seen UEs and then computes a set of unseen UEs based on the set of seen UEs and the first set of UEs. Next, the method predicts a set of UEs that have left a service region which includes the first BS and the other BSs and from this data (the first set of UEs, the set of seen UEs, and the set of UEs that have left the service region) computes a set of UEs without service. Finally, the method can include generating a visualization of the set of UEs without service and/or updating at least one operating parameter of a cellular network based on.

In some implementations, the method can identify the first BS by identifying an out-of-service cellular base station. In some implementations, the the method can identify the first set of UEs connected to the first BS in a pre-outage time window by querying a mobility manager for a set of UEs connected to the first BS in a time window preceding the first time. In some implementations, the method can identify the second set of UEs by querying a mobility manager for sets of UEs connected to the other BSs in a time window after the first time. In some implementations, the method can identify the second set of UEs by computing intersections between the sets of UEs connected to the other BSs in the time window with the first set of UEs. In some implementations, the method can compute a set of seen UEs based on the second set of UEs and the first set of UEs by iterating through a plurality of time windows for each of the other UEs and combining sets of UEs associated with each combination of time window and other BS to form the set of seen UEs. In some implementations, the method can compute a set of unseen UEs by computing the difference of the first set of UEs and the set of seen UEs. In some implementations, the method can predict a set of UEs that have left a service region including the first BS and the other BSs by predicting a size of the set of UEs based on historical UE activity with the first BS. In some implementations, the method can compute a set of UEs without service by computing a difference of the first set of UEs, the set of seen UEs, and the set of UEs that have left the service region. In some implementations, the method can generate a visualization of the set of UEs without service by generating one of a heat map or tabular display of the set of UEs without service.

FIG. 1 is a block diagram illustrating a system for tracking UE dynamics.

In some implementations, a system can include a plurality of base stations (e.g., BS 104A, BS 104B, BS 104C) and a core network 116 that includes a mobility manager 106, dynamics processor 108, visualizer 112, and data store 110.

Figure 4:
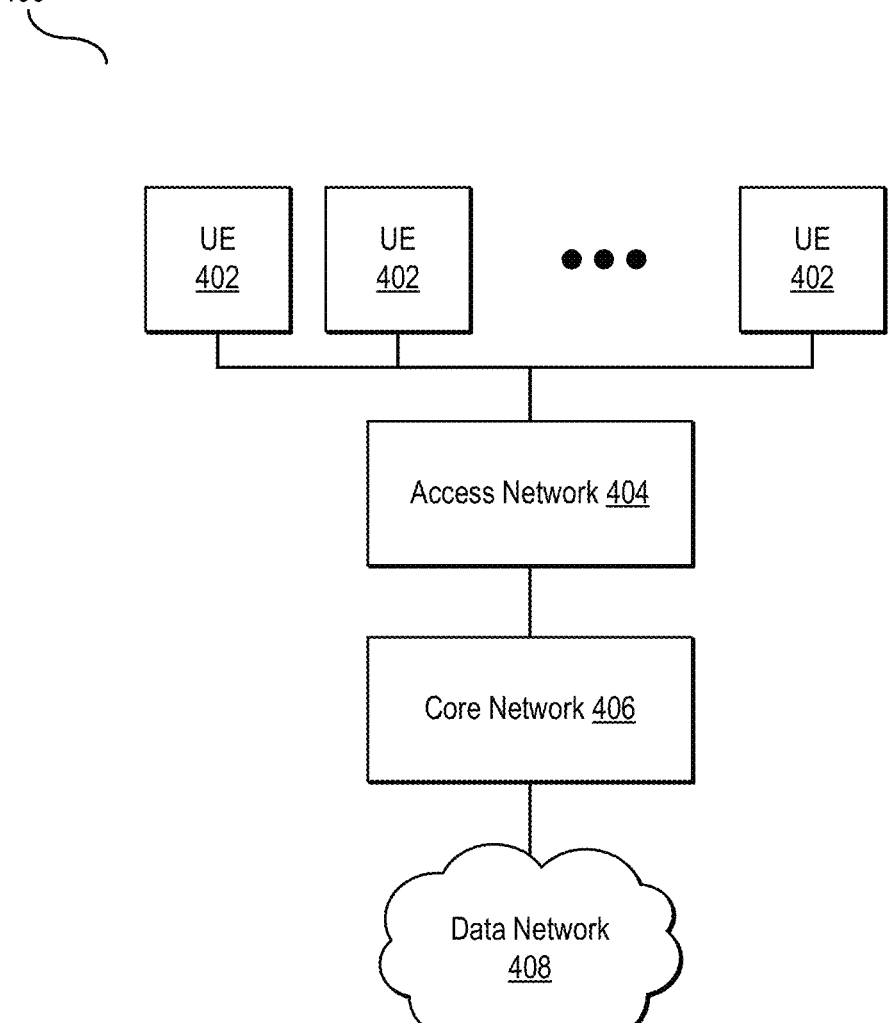
FIG. 4 is a block diagram of a cellular network according to some embodiments.
Figure 5:
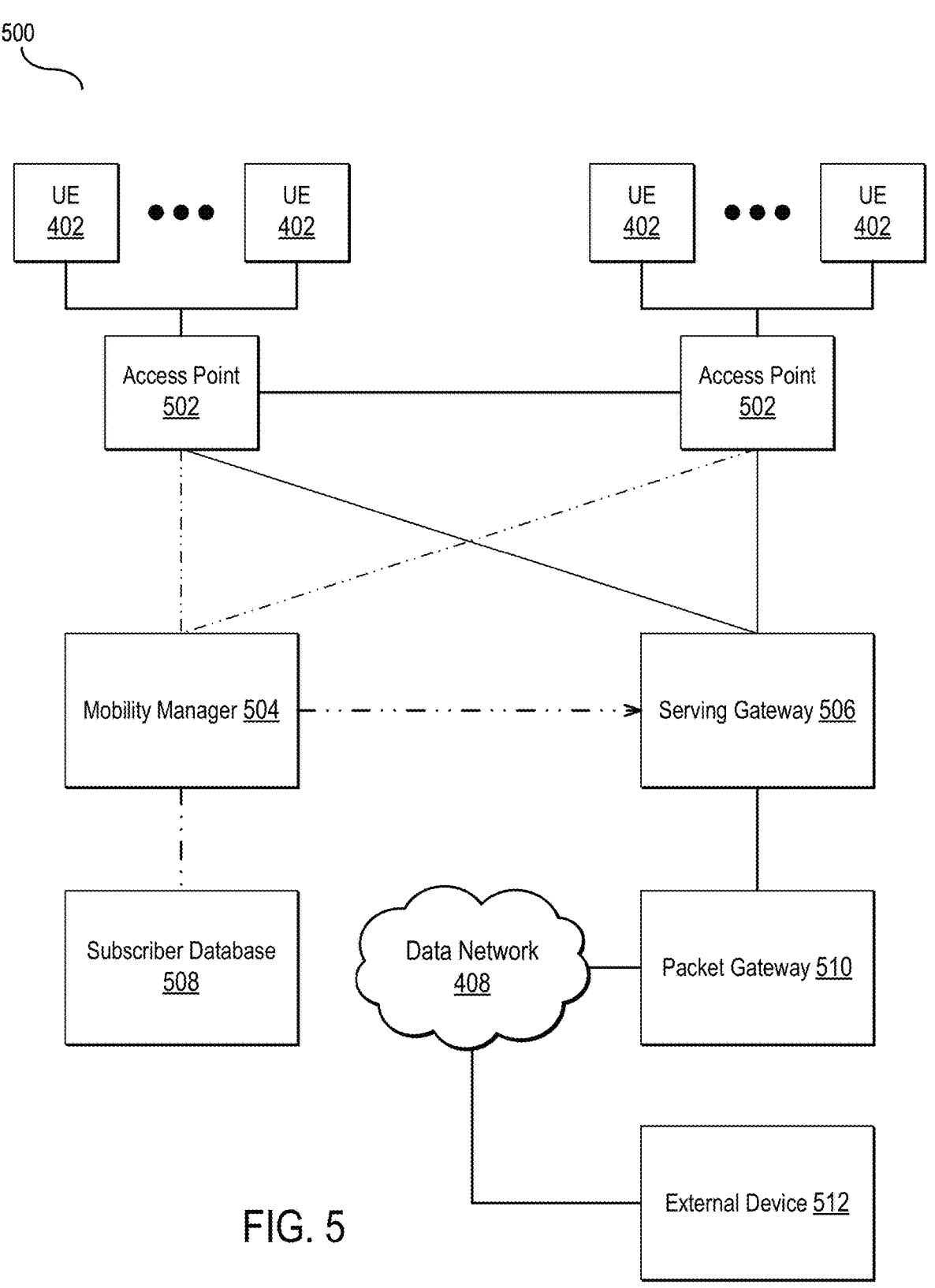
FIG. 5 is a block diagram illustrating a cellular network according to some embodiments.

In some implementations, the BSs may comprise wireless access points for a wireless network. In some implementations, the BSs may form a radio access network (RAN) or similar over-the-air network. In some implementations, the BSs can comprise gNodeB or eNodeB devices and may form the RAN of a cellular network. In other embodiments, the BSs may comprise IEEE 802.11 access points or similar types of wireless access points. In general, any BS technology for communicating with UEs (not illustrated) over the air may be used, although the following description describes a cellular network. Reference is additionally made to FIGS. 4 and 5 for specific details of cellular equipment.

The BSs are communicatively coupled to a core network 116. In some implementations, the core network 116 may comprise multiple networked computing devices that provide backend services to UEs via the BSs. The core network 116 may comprise a cellular core network and may include more components than those illustrated herein. Although single components are illustrated, the core network 116 may include multiple instantiations of such components (either physically or as virtual functions or machines) and the disclosure is not limited as such. Core network 116 may provide various functions of a cellular network not described herein and not limited to the disclosed embodiments.

As illustrated, the core network 116 includes a mobility manager 106 such as a Mobility Management Entity (MME) or Access Mobility Management Function (AMF). All operations of the mobility manager 106 are not described in detail herein and standard functions of such a device may be performed by mobility manager 106. In general, mobility manager 106 can maintain records of the locations of UEs connected to the BSs (e.g., via attachment requests). In some implementations, the mobility manager 106 can comprise a physical computing device or virtualized computing device and can provide an application programming interface (API) for accessing data regarding the locations of UEs. In some implementations, this API may allow dynamics processor 108 to query the mobility manager 106 for a list of UEs connected to any given BS for any given time window. Alternatively, or in conjunction with the foregoing, the dynamics processor 108 can also query the BSs directly for such information (e.g., via base station controllers or similar devices in the BSs).

Core network 116 includes a dynamics processor 108 which can query for UE data from mobility manager 106 (or BSs) and store the data in a data store 110. No limit is placed on the type of data store 110. For example, data store 110 may comprise a relational database, key-value data store, data lake, flat file, or other type of persistent storage. In some implementations, data store 110 can alternatively comprise a volatile storage device (e.g., random-access memory). In some implementations, the dynamics processor 108 can comprise a physical computing device while in other embodiments dynamics processor 108 can comprise a virtualized computing device or network function.

In general, dynamics processor 108 can query the mobility manager 106 to identify lists of UEs for one or more BSs. The mobility manager 106 can provide the identity of the UEs to dynamics processor 108 and the dynamics processor 108 can store this associated list (e.g., BS to UE list) in data store 110. Next, dynamics processor 108 can process the lists of UEs for a given BS to generate output for visualizer 112 to generate a visualization. The specific operations of dynamics processor 108 are provided further in FIGS. 2 and 3. In brief, dynamics processor 108 can identify, in response to an outage of a given BS, a list of UEs that have lost service due to the outage. Further details of this processing are described in FIG. 2. In addition, dynamics processor 108 can also identify a ranked list of BSs that are providing UEs to another BS. For example, if a given BS (e.g., BS 104A) is experiencing a high load of UEs, dynamics processor 108 can identify which other BSs (e.g., BS 104B, BS 104C) are the highest contributor to this load, tracking the movements of UEs to the BS experiencing a heavy load. Details of this processing are described in FIG. 3.

Dynamics processor 108 may output the results of its processing to visualizer 112. The visualizer 112 can be configured to generate textual or graphical visualizations of the generated data. For example, in an implementation, visualizer 112 can generate a heat map based on a ranked list of BSs that connected to UEs prior to UEs being connected to a BS experiencing a heavy load. Other visualizations may be possible as described in more detail in FIG. 3.

In some implementations, the output of dynamics processor 108 may also be fed into other systems of the cellular network to dynamically update at least one computing device and/or network function of the cellular network. In other words, the set of lost UEs can be used by the method to update an operating parameter of the cellular network. For example, in response to detecting one or more BSs experiencing heavy load, the output of the dynamics processor 108 can trigger another device to issue a network request to another network function (NF) which can re-allocate computing resources based on the real-time conditions of the radio network. For example, a request can be sent to a Network Slice Selection Function (NSSF) which can then re-select select network slices with available resources to handle the real-time traffic. Alternatively, the core network may issue radio resource control (RRC) messages to individual BSs to adjust their operating parameters based on the detected loads of each BS.

Figure 2:
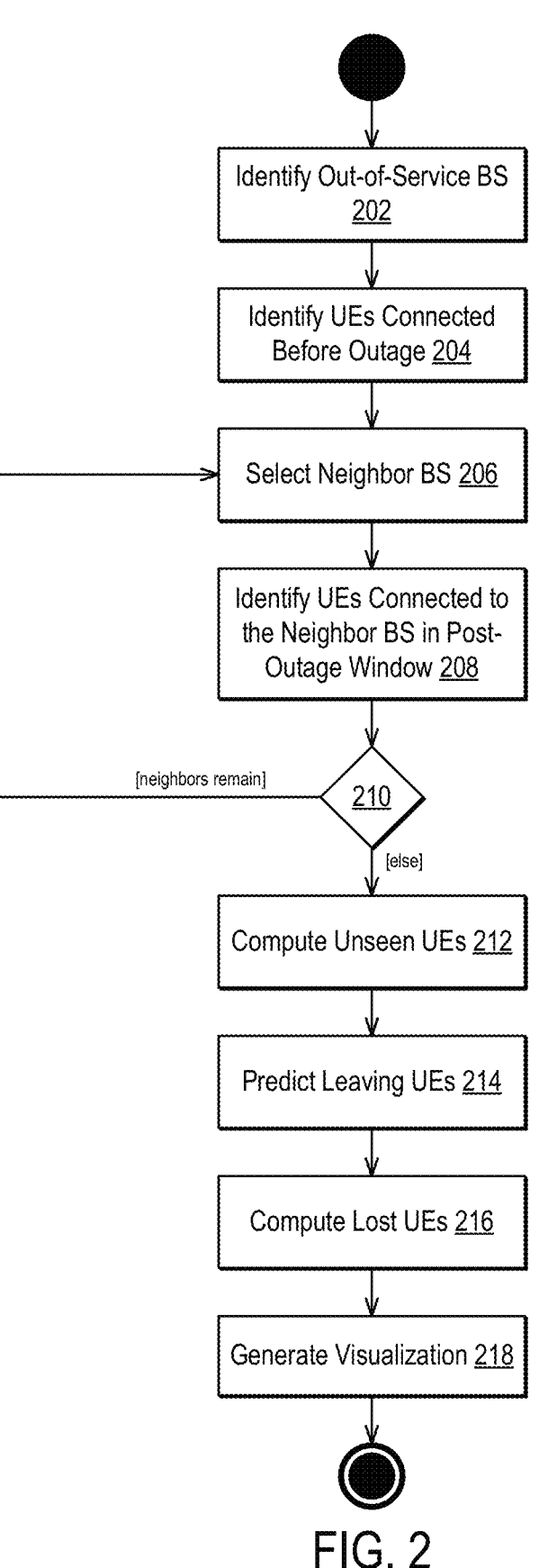
FIG. 2 is a flow diagram illustrating a method for identifying UEs that are without service within a geographic region.

FIG. 2 is a flow diagram illustrating a method for identifying UEs that are without service within a geographic region. In the following description a method is described which can allow a wireless network to identify which UEs are without service after a loss of service for a given BS.

In step 202, the method can include identifying a BS that is out of service.

In some implementations, the BS ($TRP_B$) can comprise a cellular base station such as an eNodeB device in a cellular network. For the following description, the identified BS may be servicing UEs for a first time period (0, t) and the BS goes out of service at a time t+$\Delta$t, where $\Delta$t represents a time granularity such as sixty seconds, fifteen minutes, etc. The specific value of $\Delta$t is not limiting and may be tuned as an operating parameter of the cellular network. That is, the method may be executed every $\Delta$t interval.

In step 204, the method can include identifying a set of UEs that were connected to the BS within a pre-outage time window.

As used herein, the pre-outage time window can comprise the interval prior to a known outage time. For example, the interval [t,$\Delta$t) may comprise the pre-outage time window. In some implementations, the method can issue a network request to a mobility manager (e.g., MME, AMF, etc.) to determine which UEs attached to the BS during the pre-outage time window. Other approaches may be used. For example, if the BS is still communicatively coupled to the core network, the BS can be queried directly for a listing of UEs attached during a given time window. In general, the UEs queried for may be represented as the set $$S_t^B,$$

where:

$$S_c^B = \{UE | \text{the } UE \text{ initiated or maintained a connection during the interval} [t, \Delta t)\},$$

and B represents that the set is associated with BS B. That is, $$s_t^B$$

is the set of UEs connected (and served by BS B) sometime during the pre-outage time window.

In general, when a BS goes out of service, the wireless connections of the UEs will be lost. After a short period of time, the UEs may attempt to re-connect to the wireless network by attaching to an alternative BS. The following example of a second BS ($TRP_R$) is provided.

In step 206, the method can include selecting another BS nearby the out-of-service BS. In some implementations, the BS may be selected from a set of BSs that are within a fixed distance from $TRP_B$. For example, BSs within a few miles of $TRP_B$ may be selected. In some implementations, this distance can be selected dynamically based on the size of the window and an average or maximum travel speed of a UE.

In step 208, the method can include identifying a set of UEs that were connected to the neighbor BS ($TRP_R$) in a post-outage window.

In some implementations, this post-outage window can be defined as the next interval occurring after an outage. If the outage time is represented as t+Δt, the post-outage window may be defined as [t+Δt, t+2Δt). In this manner, a set of UEs $$\left( S_{t+\Delta t}^{R} \right)$$

can be defined as $$S_{t+\Delta t}^{R} =$$

$$\{UE | UE \text{ initiated a connection with } TRP_R \text{ during time } [t + \Delta t, t + 2\Delta t)\}.$$

It may be assumed that $TRP_R$ receives attachment requests from some of the UEs serviced by $TRP_B$ prior to the outage. In some implementations, $TRP_R$ may be selected based on its proximity (geographically) to $TRP_B$ or by a similar mechanism.

Based on these assumptions, the intersection of $$S_t^B \text{ and } S_{t+\Delta t}^R \left( S_t^B \cap S_{t+\Delta t}^R \right)$$

can be defined as including the UEs that re-attached to the network after the outage of $TRP_B$. In some implementations, this intersection can be represented as $$I_{t,t+k\Delta t}^{B,R} = S_t^B \cap S_{t+\Delta t}^R.$$

In step 210, the method can include determining if any neighbor BSs in the region remain. If so, the method can re-execute step 206 and step 208 for each remaining neighbor.

In some implementations, the method (through step 206 and step 208) can include identifying a set of all UEs that attached to the network at any BS in the region during one or more post-outage windows.

Generally, there may be multiple serial post-outage windows. The first post-outage window as defined above may be represented as [t+Δt, t+2Δt), the second window may be defined as [t+2Δt, t+3Δt), etc. In step 208, the method can iterate through one or more neighboring BSs (e.g., including $TRP_R$), and iterate through one or more post-outage time windows. During these iterations, step 208 can include computing $$I_{t,t+k\Delta t}^{B,n}$$

for each BS n. This union can be represented as $$S_{seen}^B$$

and represents a set of UEs that were connected to $TRP_B$ before the outage and were seen by another BS in a post-outage window. More formally:

$$S_{seen}^B = \bigcup_n \bigcup_{k=1}^p I_{t,t+k\Delta t}^{B,n} \qquad \text{Equation 1}$$

In Equation 1, n represents a given BS in the region that is in service during the post-outage window(s), p represents a number of post-outage windows to analyze, and $$I_{t,t+k\Delta t}^{B,n}$$

represents the interaction of $$S_t^B \text{ and } S_{t+k\Delta t}^n$$

(i.e., the number of UEs that attached to $TRP_n$ in a post-outage window. In some implementations, $$S_{seen}^B$$

may be constructed based on BSs that are within a fixed distance from $TRP_B$ for example, only BSs within a few miles of $TRP_B$ may be selected. In some implementations, this distance can be selected dynamically based on the size of the window and an average or maximum travel speed of a UE.

In some implementations, the value of $$S_{seen}^B$$

can be used to compute the total number of UEs present (i.e., serviced) within a region. In some implementations, this computation can be performed as part of the method or may be computed separately to gauge the capacity of a region. In such a scenario, the value of n represents the number of BSs within the given region.

In step 212, the method can include computing a set of UEs that were attached to $TRP_B$ prior to the outage but unseen after the outage.

In some implementations, this set can be represented as $$S^B_{t,unseen} = S^B_t - S^B_{seen}.$$

In some implementations, $$S^B_{t,unseen}$$

may thus include both UEs that are without service as well as UEs that left the region under analysis. Thus, in some implementations, $$S^B_{t,unseen}$$

can be alternatively represented as $$S^B_{t,unseen,} = S^B_{t,left} \amalg S^B_{t,lost}, \text{ where } S^B_{t,left}$$

represents the UEs that left the region under analysis, $$S^B_{t,lost}$$

represents those UEs in the region under analysis that current do not have service, and '$\amalg$' represents the disjoint union of these two sets. Thus:

$$\left| S^B_{t,unseen} \right| = \left| S^B_{t,left} \right| + \left| S^B_{t,lost} \right|. \qquad \text{Equation 2}$$

In step 214, the method can include estimating the number of UEs that left the BS experiencing an outage.

In some implementations, the number of UEs that left the BS experiencing an outage $$\left( \text{i.e., } S^B_{t,left} \right)$$

can be estimated based on historical trends. For example, a configurable number of days (e.g., L=10) can be used and past windows in those days can be analyzed to determine, on a day with no outages, how many UEs normally leave the target region. As another example, a predictive model (e.g., linear regression) can be used to predict the number of UEs that normally leave a given region on a day without outages. In some implementations, other machine learning (ML) techniques such as clustering can be used to predict the number of UEs that leave a given region.

In step 216, the method can include computing the number of UEs without connectivity.

In some implementations, the method can utilize the foregoing data to compute the value of $$\left| S^B_{t,lost} \right|.$$

Specifically, Equation 2 can be rearranged as:

$$\left| S^B_{t,lost} \right| = \left| S^B_{t,unseen} - S^B_{t,left} \right| = \left| S^B_t - S^B_{seen} - S^B_{t,left} \right| \qquad \text{Equation 3}$$

As discussed above, $$S^B_t$$

was computed in step 204, $$S^B_{seen}$$

was computed after step 210, and $$S^B_{t,left}$$

can be predicted using the techniques described in step 214. Thus, in step 216, the method can include subtracting the size of $$S^B_{seen} \text{ and } S^B_{t,left}$$

from the size of $$S^B_t$$

to predict the number of UEs $$\left( \left| S^B_{t,lost} \right| \right)$$

without service after an outage. Further, in some implementations, the estimated fraction of UEs losing service can be computed as $$F^B_{t,lost} = \left| S^B_{t,lost} \right| / \left| S^B_t \right|.$$

In some implementations, multiple BSs may lose service. In such a scenario, the above method can be executed for multiple BSs to enable an operator (or automated system) to identify which BS has the most "lost" UEs and order the BSs based on the number of lost UEs. This ordering can then be used to prioritize which BSs to restore service to.

Further, in some implementations, as discussed next, the set of lost UEs $$\left( S^B_{t,lost} \right)$$

may be used to generate a visualization in step 218. For example, a heat map illustrating the number of lost UEs in one or more BSs can be displayed. Alternatively, the visualization may comprise a tabular or numerical representation of the set for visualizing. Alternatively, or in conjunction with the foregoing, the method can include feeding the set of lost UEs into other systems of the cellular network to dynamically update at least one computing device and/or network function of the cellular network. In other words, the set of lost UEs can be used by the method to update an operating parameter of the cellular network. For example, in response to detecting one or more BSs experiencing heavy load, the method can trigger another device to issue a network request to another NF which can re-allocate computing resources based on the real-time conditions of the radio network. For example, a request can be sent to a NSSF which can then re-select select network slices with available resources to handle the real-time traffic. Alternatively, the core network may issue RRC messages to individual BSs to adjust their operating parameters based on the detected loads of each BS.

Figure 3:
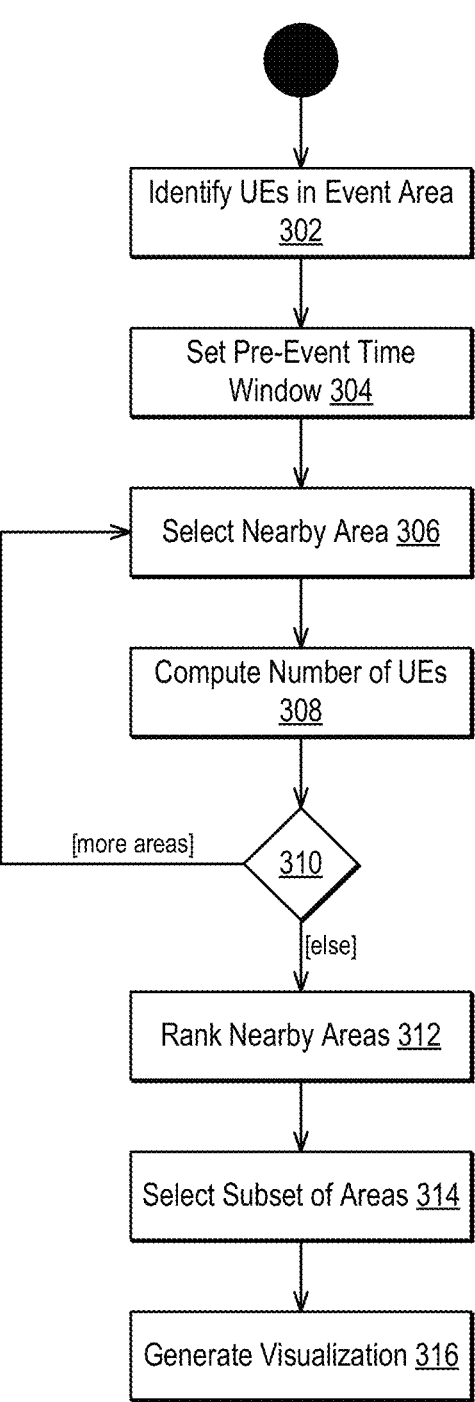
FIG. 3 is a flow diagram illustrating method for generating a heat map of UEs in a wireless network.

FIG. 3 is a flow diagram illustrating method for generating a heat map of UEs in a wireless network.

In step 302, the method can include identifying a set of UEs within an area A at a time T. In some implementations, this set can be represented as $$S_T^A.$$

In general, the area A may be near by other geographic areas $$A_{nearby} = \{A_1, A_2, \dots A_N\}.$$

In step 304, the method can include setting a pre-event time window. In some implementations, the event can comprise any fixed time point (i.e., T) and the pre-event time window can comprise an interval occurring directly prior to the fixed time point (e.g., T−Δt). In some implementations, multiple such pre-event time windows may be used (e.g., T−pΔt). The specific size of the time window and number of time windows is not limiting.

In step 306, the method can include selecting a given nearby area ($A_i$) in $A_{nearby}$ and, in step 308, computing the number of UEs in the selected area in a pre-event time period. In some implementations, this process can be similar to that of step 208 of FIG. 2 and that discussion is not repeated herein. Specifically, in step 306, the method can identify the set of UEs $$\left(S_{T-\Delta t}^{A_i}\right)$$

present in the selected area. In some implementations, step 306 can further include determining the number of UEs that traveled from the selected area to the event area A by computing the intersection $$I_{t,t+\Delta t}^{A,A_i} = S_T^A \cap S_{T-\Delta t}^{A_i}.$$

As indicated in step 310, this process can be repeated for all nearby area. In some implementations, the nearby area can comprise areas serviced by BS closest to a BS associated with the event area A, similar to the selection of BSs in a given region described in FIG. 2.

In step 312, the method can include ranking the nearby areas based on the size of the sets computed in step 306 through step 310. In some implementations, this ranking can be performed on the complete set $$\left(S_{t-\Delta t}^{A_i}\right)$$

or on the corresponding intersection set $$\left(I_{t,t+\Delta t}^{A,A_i}\right).$$

In some implementations, the method can include an optional normalization step to normalize (e.g., using a min-max normalization) the sizes of the areas in the list.

In step 314, the method can include selecting a subset of the nearby areas for presentation to a user. In some implementations, the method can include selecting the top p areas, where p can comprise a configurable parameter. For example, the top three areas based on sizes may be chosen.

In step 316, the method can include generating a visualization of the nearby areas. In some implementations, the visualization may comprise a heat map wherein a gradient of colors (e.g., red to blue) are used to represent the nearby areas. In some implementations, the highest-ranking area may be color coded red while the lowest-ranking area may color coded blue. In some implementations, directional arrows or other notations can be overlaid on the heat map to illustrate the movement of UEs from nearby areas to the event area. In some implementations, the sizing or appearance of these arrows can be adjusted based on the corresponding intersection set sizes computed previously.

In some implementations, the foregoing method may be executed on a single pre-event time period. In other implementations, the foregoing method may be repeated on multiple time periods (both pre-event and post-event) and used to generate a moving heat map of UE dynamics. For example, each time period can be associated with a corresponding visualization (using the method described above) and these visualizations can be combined to form a video or other animation of the movement of UE relative to an event or other time reference.

FIG. 4 is a block diagram of a cellular network according to some embodiments.

As illustrated, a system 400 includes UE 402 that accesses a data network 408) via an access network 404 and a core network 406. In the illustrated embodiment, UE 402 comprises any computing device capable of communicating with the access network 404. As examples, UE 402 may include mobile phones, smartphones, tablets, laptops, sensors, Internet of Things (IoT) devices, and any other devices equipped with a cellular transceiver. One example of a UE is provided in FIG. 6.

In the illustrated embodiment, the access network 404 comprises a network allowing over-the-air network communication with UE 402. In general, the access network 404 includes at least one base station that is communicatively coupled to the core network 406 and wirelessly coupled to UE 402.

In one embodiment, the access network 404 comprises a fifth-generation (5G) cellular access network. In one embodiment, the access network 404 and UE 402 comprise a NextGen Radio Access Network (NG-RAN). In an embodiment, the access network 404 includes a plurality of next Generation Node B (gNodeB) base stations connected to UE 402 via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE 402. The gNodeB may additionally include multiple network interfaces for communicating with the core network 406. In one embodiment, the gNodeB includes an interface to communicate with a mobility manager (e.g., an AMF) and a second interface to communicate with one or more gateway elements in the core network 406, such as an SMF for control data or a UPF for user data. In one embodiment, the mobility manager manages control plane traffic while the gateway elements manage user data traffic, as will be discussed. In some embodiments, base stations in the access network 404 are communicatively connected. For example, in a 5G network, individual gNodeB devices can be communicatively coupled via an X2 interface.

In one embodiment, the access network 404 comprises a fourth-generation (4G) cellular access network. In some embodiments, the access network 404 comprises an LTE access network. In one embodiment, the access network 404 and UE 402 comprise an Evolved Universal Mobile Telecommunications System (UMTS) Terrestrial Radio Access Network (E-UTRAN). In an embodiment, the access network 404 includes a plurality of Evolved Node B (eNodeB) base stations connected to UE 402 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 402. The eNodeB may additionally include multiple network interfaces for communicating with the core network 406. In one embodiment, the eNodeB includes an interface to communicate with a mobility manager (e.g., MME) and a second interface to communicate with one or more gateway elements in the core network 406, such as an S-GW or P-GW. In one embodiment, the mobility manager manages control plane traffic while the gateway elements manage user data traffic, as will be discussed. In some embodiments, base stations in the access network 404 are communicatively connected. For example, in a 4G network, individual eNodeB devices can be communicatively coupled, for example, via an X2 interface or any other interface.

In some embodiments, the access network may operate in Carrier Aggregation (CA) mode, with intra-band or inter-band carrier aggregation. In other embodiments the access network 404 may operate in a dual-connectivity mode wherein UE 402 connects to multiple base stations in the access network 404 simultaneously. In some embodiments, dual connectivity may be implemented via New Radio Dual Connectivity (NR-DC), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 404 provides access to a core network 406 to the UE 402. In the illustrated embodiment, the core network may be owned and/or operated by a mobile network operator (MNO) and provides wireless connectivity to UE 402. In the illustrated embodiment, this connectivity may comprise voice and data services. The core network 406 includes various computing devices, which are described briefly herein. Further detail of such devices is provided in FIG. 5.

At a high level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 402 to elements of the core network 406 and to external network-attached elements in a data network 408 such as the Internet. An example of a control plane function comprises authenticating that a user can access the core network 406 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 406 may include a mobility manager, one or more gateways (e.g., a serving gateway and packet gateway), and a subscriber database. In practice, the core network 406 may include more components than these. In a 4G network, the mobility manager may be implemented by an MME, the serving gateway by an S-GW, the packet gateway by a P-GW, and the subscriber database by an HSS. In a 5G network, the mobility manager may be implemented by an AMF, Session Management Function (SMF), and an Authentication Server Function (AUSF). Specifically, the AMF performs mobility management while the SMF performs session management, both of which are described herein. Further, the AUSF obtains authentication vectors from a subscriber database. In a 4G network, the Mobility Management Entity (MME) performs all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a UDR, which stores the subscriber data. Access to the UDR may be mediated by a UDM, which is part of the subscriber database, as described herein.

In brief, a UE 402 communicates with the mobility manager to authenticate and establish a session or bearer with the serving and packet gateways. The mobility manager accesses the subscriber data to confirm the UE 402 identity and communicates with the serving gateway to establish the session. Once established, the UE 402 transmits data requests through the session to the packet gateway, which manages the transmitting and receiving data to and from external network services. Specific details of these elements are provided in the following figures.

In the illustrated embodiment, the access network 404 and the core network 406 are operated by an MNO. However, in some embodiments, networks 404, 406 may be operated by a private entity and may be closed to public traffic. For example, the components of the core network 406 may be provided as a single device, and the access network 404 may comprise a small form-factor base station. In these embodiments, the operator of the device can simulate a cellular network, and UE 402 can connect to this network akin to connecting to a national or regional network.

FIG. 5 is a block diagram illustrating a cellular network according to some embodiments.

In the illustrated embodiment, a system 500 includes UE 402 communicatively connected to access points 502. As seen in FIG. 5, the access points 502 form an access network such as access network 404. In one embodiment, the access points 502 and UE 402 comprise a NextGen Radio Access Network (NG-RAN). In an embodiment, access points 502 comprise a plurality of gNodeB base stations connected to UE 402 via an air interface. In one embodiment, the air interface comprises a New Radio (NR) air interface. The gNodeB additionally includes multiple network interfaces for communicating with the core network and, specifically, mobility manager 504 and serving gateway 506. In one embodiment, the mobility manager 504 in a 5G network comprises an AMF. In one embodiment, the serving gateway 506 comprises an SMF for control data or UPF for user data.

In another embodiment, access points 502 comprise eNodeB base stations connected to UE 402 via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE 402. The eNodeB additionally includes multiple network interfaces for communicating with the core network and, specifically, mobility manager 504 and serving gateway 506. In one embodiment, the mobility manager 504 comprises an MME in a 4G network. In the illustrated embodiment, solid lines between network elements 504, 506, 508, 510 represent user data traffic, while dashed lines between network elements 504, 506, 508, 510 represent control or Non-Access Stratum (NAS) traffic.

In the illustrated embodiment, the mobility manager 504 manages control plane traffic while the gateway elements 506, 510 manage user data traffic. Specifically, the mobility manager 504 may comprise hardware or software for handling network attachment requests from UE 402. As part of processing these requests, the mobility manager 504 accesses a subscriber database 508. The subscriber database 508 comprises hardware or software that stores user authorization and authentication data and validates users to the network. In some embodiments, the subscriber database 508 may comprise a UDM and UDR in a 5G network. In another embodiment, the subscriber database 508 may comprise an HSS in a 4G network. In one embodiment, the subscriber database 508 may also store a location of the user updated via a Diameter or similar protocol.

The mobility manager 504 may also be configured to create data sessions or bearers between UE 402 and serving gateway 506 or gateway 510. In one embodiment, the serving gateway 506 and gateway 510 may comprise single or separate devices. In general, the serving gateway 506 routes and forwards user data packets while also acting as the mobility anchor for the user plane during access point handovers and as the anchor for mobility between different network technologies. For idle state UE 402, the serving gateway 506 terminates the downlink data path and triggers paging when downlink data arrives for the UE 402. The serving gateway 506 manages and stores UE 402 contexts, e.g., parameters of the IP bearer service, network internal routing information. In a 5G network, the serving gateway 506 may be implemented by an SMF. In a 4G network, the serving gateway 506 may be implemented by an S-GW.

The serving gateway 506 is communicatively coupled to a gateway 510. In general, the gateway 510 provides connectivity from the UE 402 to external Packet Data Networks (PDNs) such as data network 408 by being the point of exit and entry of traffic to external networks (e.g., 408). UE 402 may have simultaneous connectivity with plurality gateways, including gateway 510 for accessing multiple packet data networks. The gateway 510 performs policy enforcement, packet filtering for each user, charging support, lawful interception, and packet screening. In the illustrated embodiment, gateway 510 also limits access to endpoints such as an external device 512. In a 5G network, the gateway 510 may be implemented by a UPF. In a 4G network, the gateway 510 may be implemented by a P-GW.

In the illustrated embodiment, an external device 512 is communicatively coupled to the core network via the data network 408. In one embodiment, the data network 408 may comprise the Internet. In the illustrated embodiment, the external device 512, such as an application server, may comprise any electronic device capable of communicating with the data network 408, and the disclosure is not limited to specific types of network devices.

Figure 6:
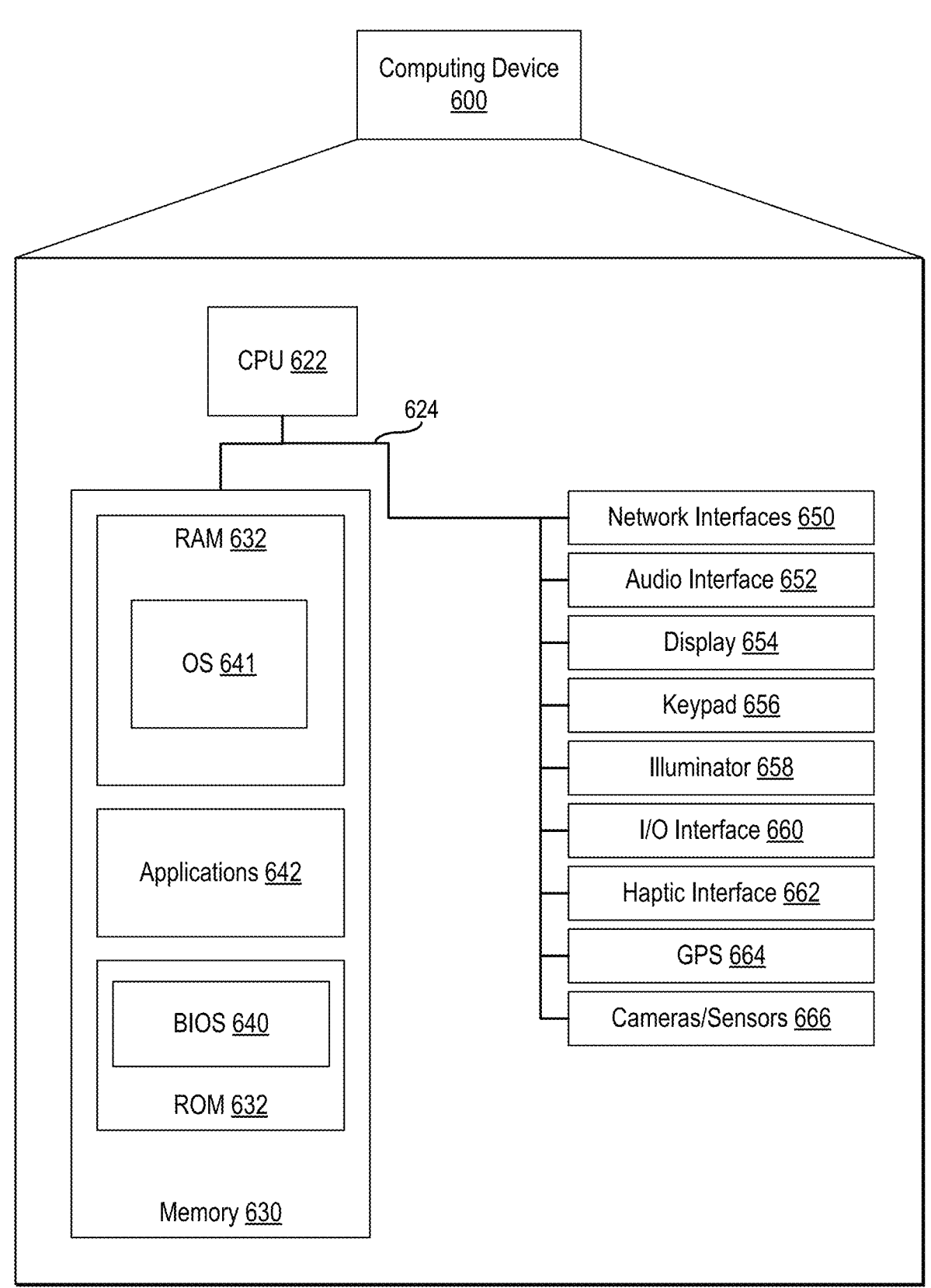
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device 600 may include more or fewer components than those shown in FIG. 6, depending on the deployment or usage of the computing device 600. For example, a server computing device, such as a rack-mounted server, may not include an audio interface 652, display 654, keypad 656, illuminator 658, haptic interface 662, Global Positioning System (GPS) receiver such as GPS receiver 664, or cameras/sensors 666. Some devices may include additional components not shown, such as graphics processing unit (GPU) devices, cryptographic co-processors, artificial intelligence (AI) accelerators, or other peripheral devices.

As shown in the figure, the computing device 600 includes a central processing unit (CPU) 622 in communication with a mass memory 630 via a bus 624. The computing device 600 also includes a network interface 650, an audio interface 652, a display 654, a keypad 656, an illuminator 658, an input/output interface (660), a haptic interface 662, a GPS receiver 664, and a camera(s) or other optical, thermal, or electromagnetic cameras/sensors 666. The computing device 600 can include a plurality of cameras/sensors 666. The positioning of the cameras/sensors 666 on the computing device 600 can change per computing device 600 model, per computing device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the computing device 600. The mass memory also stores an operating system 641 for controlling the operation of the computing device 600

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them in RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface (660) for communicating with external devices, using communication technologies, such as USB, infrared, Bluetooth™, or the like. The haptic interface 662 provides tactile feedback to a user of the client device.

The GPS receiver 664 can determine the physical coordinates of the computing device 600 on the surface of the Earth, which typically outputs a location as latitude, longitude and elevation (x,y,z) values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
identifying a first base station (BS) that is out of service at a first time;
identifying a first set of user equipment (UE) connected to the first BS in a pre-outage time window occurring before the first time;
identifying a second set of UEs, the second set of UEs comprising UEs connected to other BSs in a wireless network in a post-outage time window after the first time;
computing a set of seen UEs by computing intersections between the first set of UEs and the second set of UEs;
computing a set of unseen UEs as a difference between the set of seen UEs and the first set of UEs;
predicting a set of UEs that have left a service region that includes the first BS and the other BSs based on historical UE activity patterns;
computing a set of UEs without service based on the first set of UEs, the set of seen UEs, and the set of UEs that have left the service region; and
updating at least one operating parameter of a cellular network based on the set of UEs without service.

2. The method of claim 1, wherein identifying the first BS further comprises identifying an out-of-service cellular base station.

3. The method of claim 1, wherein identifying the first set of UEs connected to the first BS in a pre-outage time window further comprises querying a mobility manager for a set of UEs connected to the first BS in a time window preceding the first time.

4. The method of claim 1, wherein identifying the second set of UEs further comprises querying a mobility manager for sets of UEs connected to the other BSs in a time window after the first time.

5. The method of claim 4, wherein identifying the second set of UEs further comprises computing intersections between the sets of UEs connected to the other BSs in the time window with the first set of UEs.

6. The method of claim 1, wherein computing a set of seen UEs based on the second set of UEs and the first set of UEs comprises iterating through a plurality of time windows for each of the other UEs and combining sets of UEs associated with each combination of time window and other BS to form the set of seen UEs.

7. The method of claim 1, wherein computing a set of unseen UEs comprises computing a difference of the first set of UEs and the set of seen UEs.

8. The method of claim 1, wherein predicting a set of UEs that have left a service region including the first BS and the other BSs comprises predicting a size of the set of UEs based on historical UE activity with the first BS.

9. The method of claim 1, wherein computing a set of UEs without service comprises computing a difference of the first set of UEs, the set of seen UEs, and the set of UEs that have left the service region.

10. The method of claim 1, wherein generating a visualization of the set of UEs without service comprises generating one of a heat map or tabular display of the set of UEs without service.

11. A non-transitory computer-readable storage medium for tangibly storing computer program instructions capable of being executed by a computer processor, the computer program instructions defining steps of:
identifying a first base station (BS) that is out of service at a first time;
identifying a first set of user equipment (UE) connected to the first BS in a pre-outage time window occurring before the first time;
identifying a second set of UEs, the second set of UEs comprising UEs connected to other BSs in a wireless network in a post-outage time window after the first time;
computing a set of seen UEs by computing intersections between the first set of UEs and the second set of UEs;
computing a set of unseen UEs as a difference between the set of seen UEs and the first set of UEs;
predicting a set of UEs that have left a service region that includes the first BS and the other BSs based on historical UE activity patterns;
computing a set of UEs without service based on the first set of UEs, the set of seen UEs, and the set of UEs that have left the service region; and
updating at least one operating parameter of a cellular network based on the set of UEs without service.

12. The non-transitory computer-readable storage medium of claim 11, wherein identifying the first set of UEs connected to the first BS in a pre-outage time window further comprises querying a mobility manager for a set of UEs connected to the first BS in a time window preceding the first time.

13. The non-transitory computer-readable storage medium of claim 11, wherein identifying the second set of UEs further comprises querying a mobility manager for sets of UEs connected to the other BSs in a time window after the first time.

14. The non-transitory computer-readable storage medium of claim 11, wherein computing a set of seen UEs based on the second set of UEs and the first set of UEs comprises iterating through a plurality of time windows for each of the other UEs and combining sets of UEs associated with each combination of time window and other BS to form the set of seen UEs.

15. The non-transitory computer-readable storage medium of claim 11, wherein computing a set of UEs without service comprises computing a difference of the first set of UEs, the set of seen UEs, and the set of UEs that have left the service region.

16. A device comprising:
a processor configured to:
identify a first base station (BS) that is out of service at a first time;
identify a first set of user equipment (UE) connected to the first BS in a pre-outage time window occurring before the first time;

identify a second set of UEs, the second set of UEs comprising UEs connected to other BSs in a wireless network in a post-outage time window after the first time;

compute a set of seen UEs by computing intersections between the first set of UEs and the second set of UEs;

compute a set of unseen UEs as a difference between the set of seen UEs and the first set of UEs;

predict a set of UEs that have left a service region that includes the first BS and the other BSs based on historical UE activity patterns;

compute a set of UEs without service based on the first set of UEs, the set of seen UEs, and the set of UEs that have left the service region; and updating at least one operating parameter of a cellular network based on the set of UEs without service.

17. The device of claim 16, wherein identifying the first set of UEs connected to the first BS in a pre-outage time window further comprises querying a mobility manager for a set of UEs connected to the first BS in a time window preceding the first time.

18. The device of claim 16, wherein identifying the second set of UEs further comprises querying a mobility manager for sets of UEs connected to the other BSs in a time window after the first time.

19. The device of claim 16, wherein computing a set of seen UEs based on the second set of UEs and the first set of UEs comprises iterating through a plurality of time windows for each of the other UEs and combining sets of UEs associated with each combination of time window and other BS to form the set of seen UEs.

20. The device of claim 16, wherein computing a set of UEs without service comprises computing a difference of the first set of UEs, the set of seen UEs, and the set of UEs that have left the service region.

* * * * *